Figure 1:
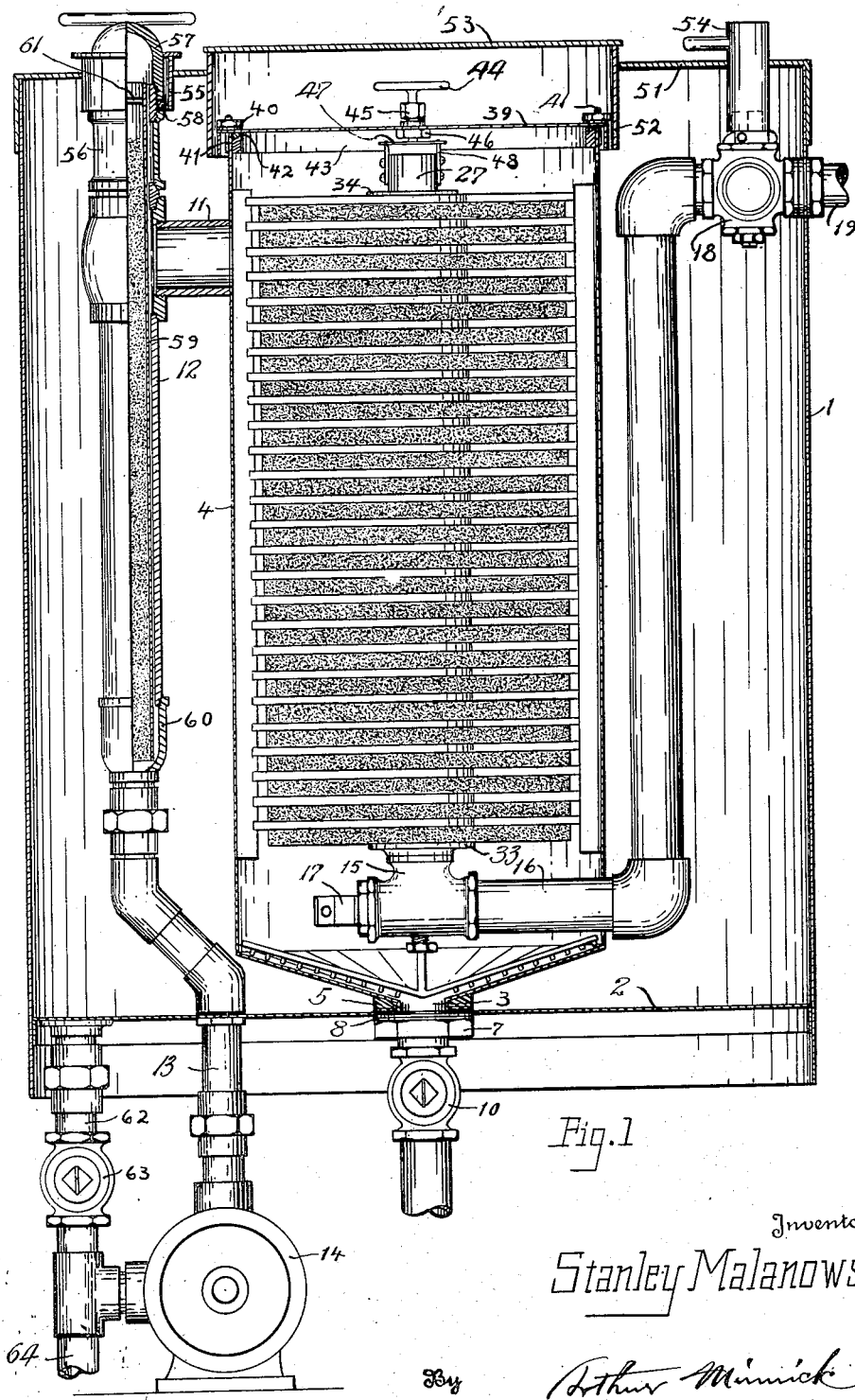

Jan. 13, 1942.  S. MALANOWSKI  2,269,725
FILTER
Filed Aug. 11, 1937  4 Sheets-Sheet 1

Inventor
Stanley Malanowski

By Arthur Minnick
Attorney

Jan. 13, 1942.  S. MALANOWSKI  2,269,725
FILTER
Filed Aug. 11, 1937  4 Sheets-Sheet 2
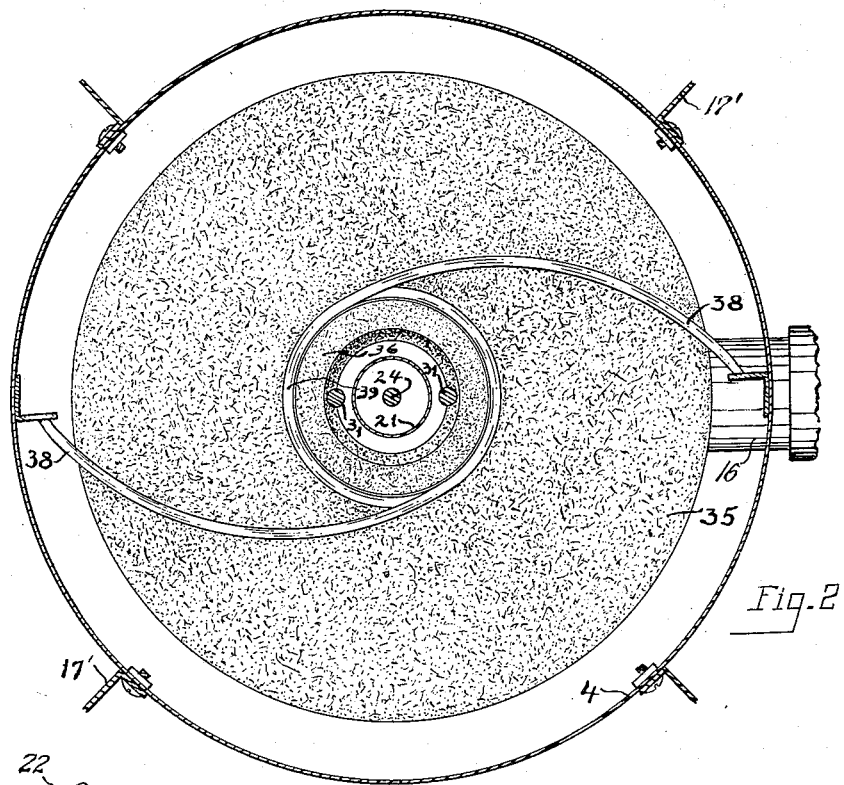
Fig. 2
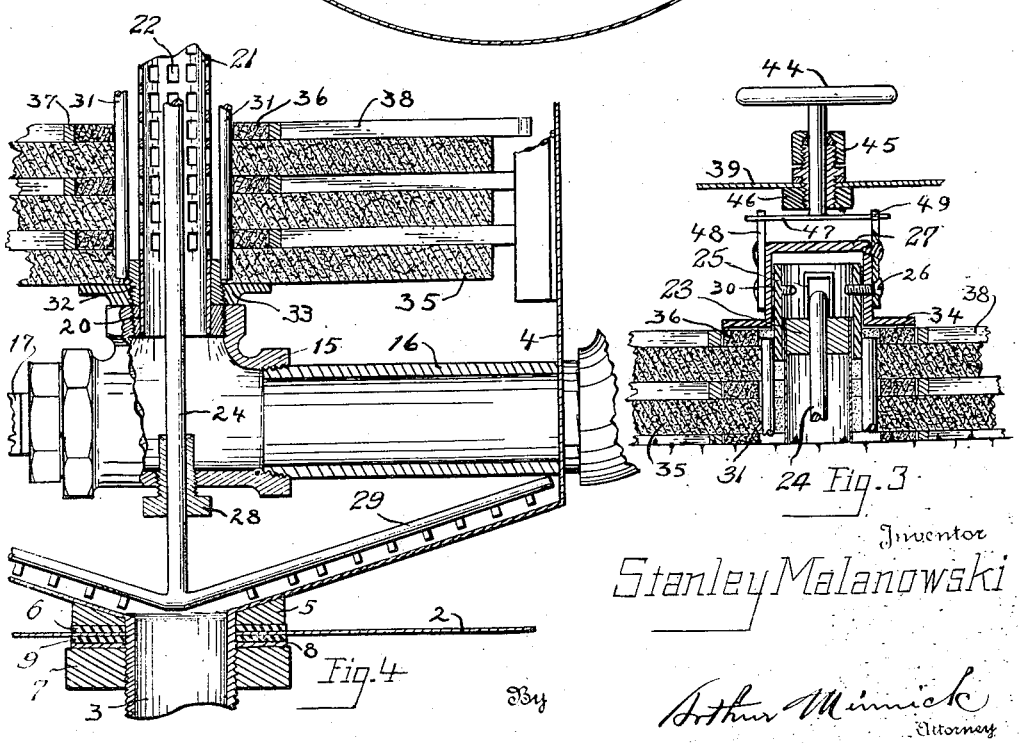
Fig. 3
Fig. 4
Inventor
Stanley Malanowski
By
Arthur Minnick
Attorney Jan. 13, 1942. S. MALANOWSKI 2,269,725
FILTER
Filed Aug. 11, 1937 4 Sheets-Sheet 3
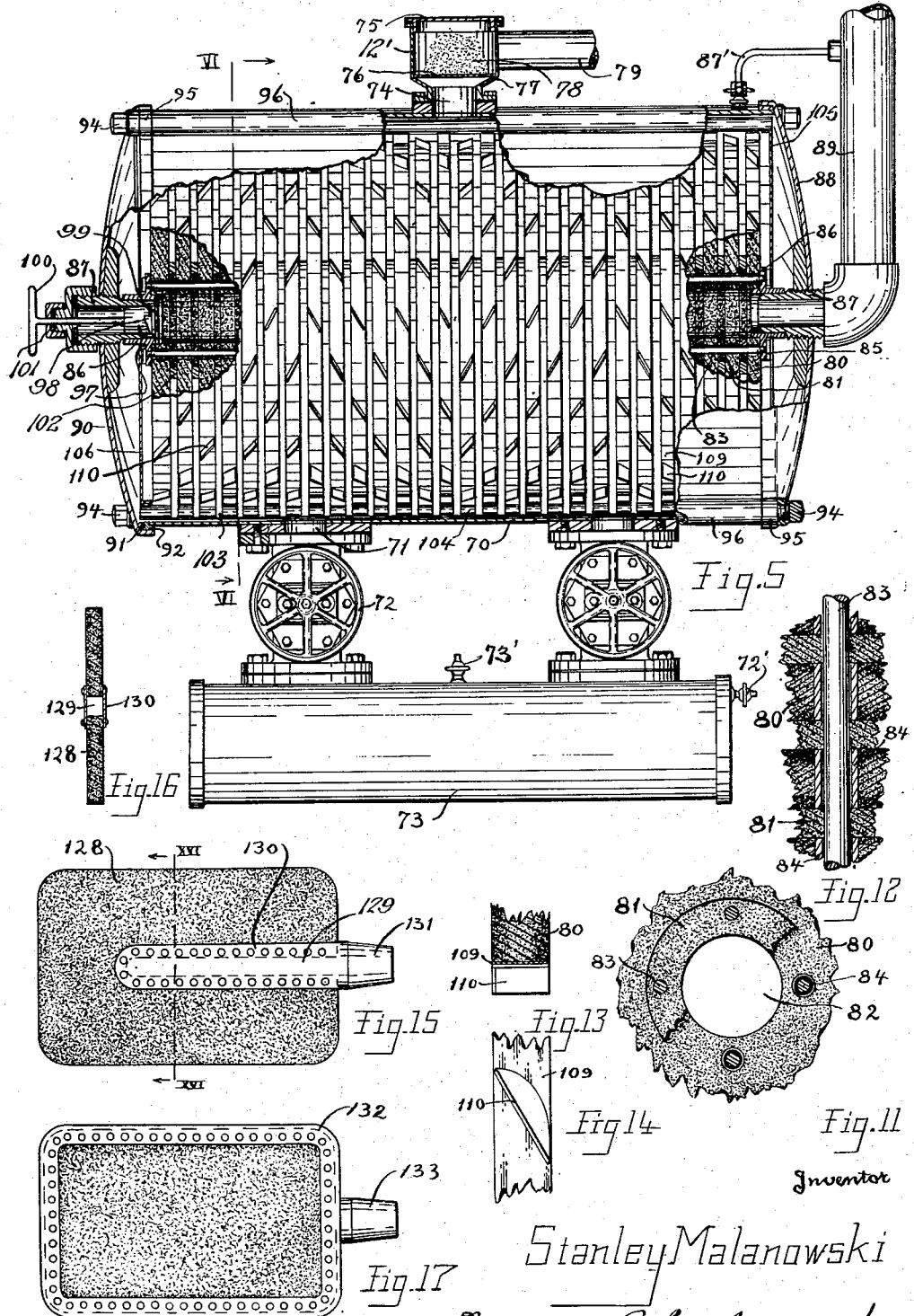

Jan. 13, 1942.    S. MALANOWSKI    2,269,725
FILTER
Filed Aug. 11, 1937    4 Sheets-Sheet 4
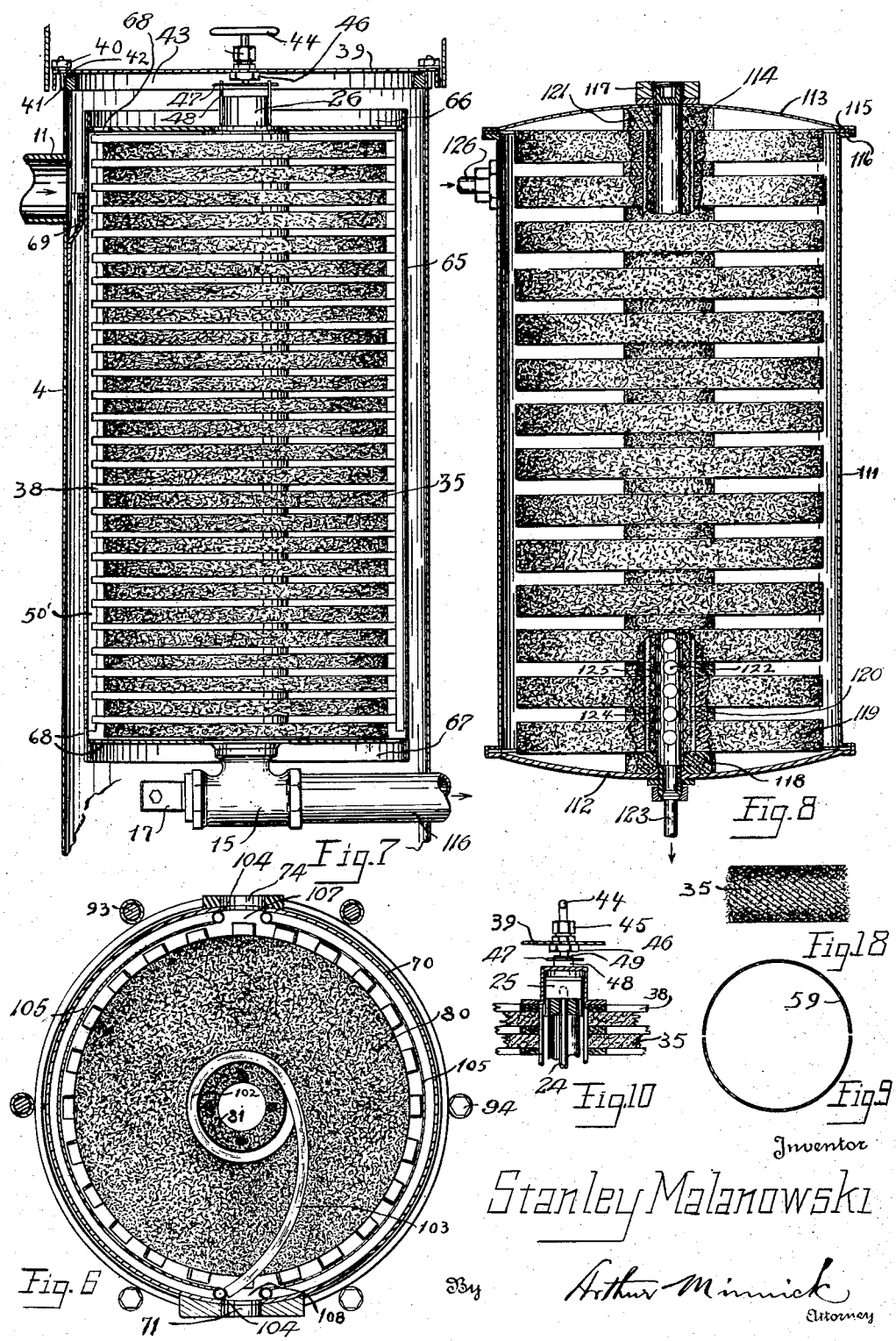
Inventor
Stanley Malanowski
By Arthur Minnick
Attorney Patented Jan. 13, 1942

2,269,725

UNITED STATES PATENT OFFICE 2,269,725

FILTER

Stanley Malanowski, Tampa, Fla.

Application August 11, 1937, Serial No. 158,455

10 Claims. (Cl. 210—119)

This invention relates to apparatus and material for the rapid and efficient removal of finely divided matter from various liquids.

In one embodiment of the invention, a device is illustrated for use in a system in which solvent cleansing fluid is forced in a constant cycle through a washing machine in which soiled material is cleaned and thence through a tank containing a filter assembly adapted to remove solids in suspension, and grease and other substances in solution, whereby the solvent is purified and returned to the washing machine in a continuous cycle during the washing process.

In another embodiment of the invention, a smaller device is shown for use beneath the hood of an automobile as part of a cyclic oil system to remove from the oil in the crankcase of the engine all solid particles such as sand, iron, carbon, and any other material that might cause wear or other interference with the effective operation of the engine.

As the description proceeds, it will become evident that the invention is not limited to use with oils or solvents, but is also adaptable for use with many other liquids which may require clarification or decolorization, as in filtering beer, wines, and distilled spirits, beet juice, raw sugar solutions, drinking water and many others.

The primary object of the invention is to utilize the many advantages of the dense, stiff, and strong sheets of fibrous material produced by compression under proper conditions of heat and moisture of wood fiber prepared by explosion from a gun. The disrupted and disintegrated fibers comprising both fine and coarse particles crisscrossed in various directions and formed into boards having two surfaces of relatively dense and strong material united by a central layer of relatively high porosity are particularly well adapted for use as filter units. In certain cases, these sheets may be used alone, but when the surface density is not sufficiently great, or where additional effects of adsorption or decolorization are desired, filter aids, such as diatomaceous earth, fuller's earth, activated carbon, may be added to the liquid passing through the fibrous units to adhere to their surfaces as a highly efficient clarifying medium which may be removed by a simple form of scraper at proper intervals to leave a surface on which a new layer of filter aid may be deposited for continued operation of the device without removal of the units from their enclosing casing.

A further object of the invention is to provide in small cubic space an extremely large surface to receive the liquid to be filtered, by arranging a large number of flat, thin disks with their centers in axial alinement and spaced apart by relatively thin separators, to permit the liquid under pressure to pass through both of the dense surfaces of each sheet to the more highly porous central layer which acts substantially as a plurality of tubes through which it may proceed to an outlet passage formed within the central portion of the assembly.

As a supplemental object of the invention in connection with the form of assembly just described is the provision of means for allowing the compression of the disks and separators to proceed far enough to make a tight joint but preventing compression to an extent that will unduly limit the passage of filtered liquid.

Another object of the invention in connection with the same form of disk and separator assembly is the provision of means for mounting the filter disks for rotation while maintaining interposed scrapers stationary to remove filter aid and dirt, and the provision of additional means for directing the refuse after it has been scraped from the disks to an outlet from which it may leave the filter casing.

In the drawings, Figure 1 is a vertical section through the center of a storage tank and filter chamber particularly adapted for clarifying liquids used in dry cleaning; Fig. 2 is a horizontal section on a larger scale through the filter tank of Fig. 1; Fig. 3 is a fragmentary vertical section showing details of the upper end, and Fig. 4 is a fragmentary vertical section of the lower end of the filter assembly of Fig. 1; Fig. 5 is a vertical section taken longitudinally of another embodiment of the invention in which filter disks are mounted in vertical planes; Fig. 6 is a vertical section on the line VI—VI of Fig. 5; Fig. 7 is a vertical section through a modification of the structure of Fig. 1; Fig. 8 is a vertical section through the casing of an oil filter for automobiles, with the filter assembly shown partly in elevation and with parts broken away and in section; Fig. 9 is a transverse section through the tube used to supply filter aid in the device shown in Fig. 1; Fig. 10 is a fragmentary section on a smaller scale of the parts shown in Fig. 3, the sections of the two figures being in planes at right angles to each other; Fig. 11 is a fragmentary elevation of the central part of a filter disk and of a separator having the construction shown in Fig. 5; Fig. 12 is a fragmentary section through parts of four filter disks and three interposed separators, showing the mounting of a tie rod where the bushings are used; Fig. 13 is a fragmentary section of one edge of a filter disk of the type shown in Fig. 5, with the sludge vane attached thereto shown in elevation; Fig. 14 is is an end view of the sludge vane shown in Fig. 13; Fig. 15 is an elevation and Fig. 16 is a transverse section of a filter element of the familiar type shown in patent to Heckman, 2,041,763, May 26, 1936; Fig. 17 is an elevation of a modified form of the same structure; and Fig. 18 is a fragmentary section through a preferred form of fiber board used in the preparation of filter elements.

The structure illustrated in Fig. 1 is similar in many ways to that shown in patent to Malanowski, 2,024,463, December 17, 1935, both having a storage tank 1 in which is mounted a filter tank capable of receiving its fluid to be clarified either from the storage tank or from an outside source, as a washing machine, and the filter tank having two discharge outlets, one leading to the storage tank and the other to an outside place of delivery.

In the present device, the storage tank 1 has a bottom 2 having a central opening for the reception of a pipe 3 formed at the lower end of the conical bottom of the filter tank 4. As best shown in Fig. 4, the tank 4 rests upon a washer 5 and a gasket 6, and the pipe 3 is held in place by a nut 7 having a washer 8 and gasket 9 interposed between it and the tank bottom 2 to form a liquid-tight joint. A valve 10 is provided for normal closure of the pipe 3. Near its upper end, the tank 4 has an inlet pipe 11 communicating with a filter aid chamber 12 into the lower end of which discharges a pipe 13 leading through the tank bottom from a pump 14. Within its lower end, the tank 4 has a fitting 15 secured to the wall of the tank on one side by a pipe 16 and on the other side by a brace member or members 17. The pipe 16 on the outside of the tank 4 leads to a three-way valve 18, which in one position discharges into a pipe 19 leading to a washing machine, as in the previously mentioned patent to Malanowski, or elsewhere, as desired. The tank 4 may be secured to the tank 1 by a plurality of braces 17' of which the terminals are indicated in Fig. 2, these braces being omitted from Fig. 1.

In the top of the fitting 15 is secured a sleeve or bushing 20, which is securely attached to the bottom of a tube 21 having a group of perforations 22 in its lower end as indicated in Fig. 4.

At the upper end of the tube 21, is a plug 23 having an axial passage for a rod 24, to the top of which is welded or otherwise secured a cross member 25, shown in Fig. 3 as formed of a U-shaped channel piece of sufficient length, as shown in side view in Fig. 10, to engage the end of a screw or screws 26 projecting through the side walls of a sleeve 30. The lower end of the rod 24 is rotatably mounted within a bushing 28 secured within the lower surface of the fitting 15 coaxially with the tube 21. Two arms 29 extend in opposite directions from the lower end of the rod 24, each arm having a plurality of pins projecting therefrom into close proximity to the conical bottom of the tank 4.

A cap 27 is shown in Fig. 3 secured by screws 26 to the sleeve 30, the inside diameter of which is slightly larger than the diameter of the upper end of the tube 21 which extends into the lower end of the sleeve. Upon opposite sides of the sleeve 30, are welded or otherwise secured rods 31, which at their other ends are also welded or otherwise secured to a sleeve 32, externally threaded to receive a threaded flange member 33. The cap 27 has a flange 34.

Between the flange of member 33 and the flange of the cap 27 are mounted a plurality of circular, flat, fibrous filter elements 35 spaced from each other by circular, flat spacers 36, each of which is surrounded by a metallic hub or ring 37 from which curved scrapers 38 extend outwardly, with their outer ends beyond the outer edges of the filter elements. The scrapers 38, as shown in Fig. 2, arch outwardly from the hub with the scraping edges approximately tangent to the hub at their innermost ends and at about 45° to the radius from the center at the point at which they leave the edges of the disks. The angle of contact of the scraping edge with the direction of movement of the surface of the disk gradually increases from the hub outward and any material adhering to the surface of the disks is thus thrust outward away from the hub. This arched construction greatly adds to the resistance of the scrapers to sidewise bending. As best shown in Fig. 2, these elements 35 and spacers 36 have central openings larger in diameter than the tube 21, with notches in opposite sides of the openings in the elements 35 for engagement with the rods 31. The sleeve 30 is shown in Fig. 3 as smaller than the opening in the elements and spacers to permit them to be placed on the rods 31 from the top before the cap 27 is secured in place by the screws 26. The bushing or sleeve 32 is also smaller in diameter than the openings in the disks and separators, so that before the flanged member 33 is secured on the sleeve 32, the disks and separators may be placed on the rods from the bottom also, as may be more convenient.

When the filter members, spacers and scrapers have all been placed in order upon the rods, the flanged member 33 may be screwed upon the sleeve 32 to clamp the assembly securely together between the flanges at the opposite ends with the spacers closing the sides of the central opening between the disks, and the cap 27 closing the upper end. The assembly so formed may be handled as a unit to place it upon the tube 21 with the lower surface of the member 33 resting with a ground joint upon the upper surface of the fitting 15. The lid 39 of the tank 4 may then be placed in position and clamped tight by nuts 40 engaging studs 41 around the upper rim of the tank. A gasket 42 in an annular ring member 43 welded within the upper rim acts to form a liquid-tight seal for the tank lid. Mounted centrally of the lid 39 is the stem of a hand crank 44 which can rotate in a gland or stuffing box 45 secured upon the lid by the nut 46. At its lower end, the crank has secured thereupon a spring pawl member 47 adapted for engagement with a pair of lugs 48 secured upon opposite sides of the cap 27. These lugs are beveled at the top as shown at 49 in Figs. 3 and 10, so that if the crank is rotated in one direction, the ends of the spring 47 will ride up the bevels without turning the cap, but when turned in the opposite direction, the spring ends will engage the vertical sides of the lugs and cause rotation of the cap, the sleeve 30, the rods 31, and thus of the whole assembly around the tube 21, the weight being carried by the member 33 and the fitting 15.

At the bottom, the tube 21 fits closely within the sleeve 32, and at the top, it fits closely within the sleeve 30, thus forming a vertical journal on which the assembly can be turned freely with no sidewise tilting. As the cap turns, the inner projecting ends of the screws 26 will engage the cross bar 25 to turn it around on the upper surface of the plug 23 and the suspended rod 24 with its arms 29 will be turned about its axis. A flange 50 is secured on the inner wall of the tank 4 on each side for engagement with the opposite ends of the scrapers 38 to prevent their rotation as the filter disks are turned. Any solid matter adhering to the surfaces of the disks will thus be thrust against the scrapers and will slide outward along the curved sides of the scrapers to the outer rim of the disks, where it will fall downward through the space between the tank wall and the disks into the conical bottom, on which any solid matter has been loosened by the rotation of the arms 29, so that the whole deposit will pass out through the pipe 3 when the valve 10 is opened.

The filter elements 35 are preferably constructed of fiber sheets having their inner portions of relatively high porosity and their outer portions of relatively lower porosity, as indicated by the relative amount of stippling in Fig. 18. A satisfactory commercial product having these desirable characteristics is described and the method in use in its manufacture is fully set forth in the patent to Mason, 1,663,504, dated March 20, 1928, though it will be understood that this invention is not limited to any specific process of manufacture or to any specific form of fiber. A board of compressed fiber having sufficient coherence and rigidity to maintain itself in a liquid of the kind that is to be filtered without too great warping or swelling such as to affect its efficiency for its intended use, and having a constituent mass of fibers permeable to the liquid but dense enough to stop and hold the filter aids that may be required by the condition of the liquid may be formed into a filter element such as has been described, and the separators may also in some cases be formed of the same material because it so readily forms a liquid-tight joint beween the filter elements, and is at once light and inexpensive. The spacers may, of course, be made of a different material, if desired.

The main tank 1 which surrounds the tank 4 has a cover member 51 with three openings. The central opening has a collar 52, preferably of only a little greater diameter than that of the cover or lid 39 to prevent objects from sliding off the cover into the storage tank. A flat cover 53 rests upon the collar 52 with any form of connection desired to hold it in place, none being shown. A smaller opennig in the cover 51 admits a key or handle 54 for the valve 18, and a somewhat larger opening has a collar 55 surrounding the fitting 56 at the upper end of the filter aid chamber 12. A cap 57 is secured by a threaded connection with the fitting 56, and a washer 58 at the juncture of the cap, collar, and fitting forms a liquid-tight seal. A thin split tube 59 is shown in section in Fig. 9, which rests at its lower end in a fitting 60 at the lower end of the chamber 12. This tube may be withdrawn from the chamber by engaging a finger under a cross-pin 61 in the upper end of the tube. The thin metal of the tube will yield and spread a little as it is thrust into a mass of powdered solid filter aid, which will be retained by the elasticity of the tube while it is lifted and set into position in the chamber 12. Fluid forced by the pump 14 up through the pipe 13 into the chamber 12 will wash the filter aid along with it, and as the liquid enters the spaces between the filter disks following the paths of least resistance, the filter aid will be deposited over the surfaces in accordance with the amount of liquid entering at any point until the resistance is substantially uniform over the whole assembly.

Different filter aids will be used for different liquids having the physical and chemical properties best suited in each instance to the liquid to be treated and in accordance with the size of the particles to be removed. Because of the relatively high density of the smooth surfaces formed by the action of heat and pressure on such boards, only a small amount of filter aid will be required as compared with filters using bags and metallic screens. The ease of cleaning the filter elements, of removing the sludge, and of applying the filter aid, are important features of the invention, while the efficiency of filtration is very high.

While the present invention is not primarily concerned with details of arrangements of pipes, valves, and tanks, an outlet pipe 62 is indicated forming an outlet passage controlled by a quick-action valve 63 to enable the operator to drain the main tank into an underground tank rapidly when desired, or, with other valves (not indicated) closed, liquid from the tank 1 may be withdrawn through the valve 63 and forced by the pump 14 through the filter and out through pipe 19 to a washer, as shown in the previous Malanowski patent cited, from which it may be returned through the pipe 64 to the pump for further passage through the filter.

Since the filter elements are the only parts of the device which are likely to require replacement over long periods of use, and since the preparation of the assembly requires a certain skill, a special form of protective casing has been devised in which the entire group of filter elements can be enclosed at the factory and shipped in a relatively light carton to the place of use, where the casing may be left in its entirety, and the whole assembly can be placed upon the tube 21 within the casing 4.

Such a modification is illustrated in Fig. 7, in which the parts 4, 11, 15, 16, 17, 27, 35, and 38 to 48 inclusive are identical in structure and function with the correspondingly numbered parts in Figs. 1, 2, 3, and 4.

The metallic casing 65 is formed as a cylinder with a flanged top 66 and a flanged bottom 67 secured as by welding within the ends of the cylinder. A series of perforations 68 around the top and bottom permit the entry into the casing of fluid under pressure from the tank 4. A baffle plate 69 opposite the intake pipe 11 directs the fluid and filter aid upward so that most of the powdered matter will enter at the top, while any that settles down between the casing and the tank wall will be drawn in at the bottom holes. The flange on the cap 27 will be modified to provide stepped concentric flanges, of which the upper and smaller engages within and centers the central perforation in the casing top 66, while the lower step acts as a support on which the casing hangs suspended so that its bottom member is just out of engagement with the lower surface of the lowermost filter disk 35. Flanges 50' on the inside of the casing act as stops for the scrapers 38. Any suitable means may be used to prevent rotation of the casing within the tank 4.

In practice, a projection on the casing will engage one of the bolts or nuts used to secure the braces 17' to the wall of the tank 4.

Another modification of the invention in which the filter disks are mounted to lie in a vertical position with their axis of rotation horizontal, is shown in Figs. 5 and 6. In this form, the filter tank 70 is shown as a cylinder having its axis set horizontally and having two outlet openings 71 controlled by gate valves 72 which discharge into a sludge tank 73. An inlet opening 74 at the top of the tank has a cuplike receptacle 12' provided with a threaded cover 75. A loose, flat sheet metal false bottom 76 having peripheral openings 77, rests within the receptacle to hold powdered filter aid 78, this false bottom acting to prevent the powder from falling in a mass into the pipe until it is washed in by the liquid to be filtered entering through intake pipe 79.

As best shown in Figs. 11 and 12, the filter disks 80 and the separators 81 have a central opening 82 adjacent to which are a plurality of perforations of a size in the separators to receive rods 83, and somewhat larger in the filter disks to receive metallic bushings 84 having an inside diameter sufficient to permit free passage of the same rods 83. The ends of the rods are threaded to receive nuts 85. At each end of the assembly, flanged members 86 have perforations to receive the ends of the rods after the disks, separators and scrapers have been assembled with the rods passed through the perforations, and by tightening nuts 85 on the rods until the ends of the bushings engage firmly against the separators, the disks will be sufficiently compressed to form a tight joint with the separators but not enough to prevent free passage of liquid from the disks into the central passage formed by the openings 82.

In each end of the tank 70 is secured a sleeve member 87 having a portion within the tank of a size to fit closely but yet rotatably within the flanged member 86 adjacent thereto. An end 88 may be welded or otherwise permanently secured to the outlet end of the tank, and to the sleeve 87 at this end will be connected the discharge pipe 89. At the other end of the tank, the end member 90 will bear against a gasket 91 held within a channel member 92 secured within the inner periphery of the end of the tank 70. A plurality of clamp rods 93 having end nuts 94 to engage against sleeves 95 welded upon the end cover members 88 and 90 serve to secure the cover 90 in place. Tubes 96 of the same diameter as the sleeves 95 surround the rods 93 between the sleeves 95, for the sake of appearance.

The sleeve member 87 within the end 90 has slidably mounted therein a cylindrical element 97 having a notch 98 in its end adapted to engage in one direction of rotation with a crosspin 99 secured at its ends within the member 86. One side of the notch is shown as at right angles to the plane of rotation of the pin while the other side slopes outward from the bottom of the notch. The member 97 is provided with a handle 100 extending through the stuffing box 101 to prevent the escape of liquid. By the use of this hand crank, the filter assembly may be rotated as a unit upon the inwardly projecting terminals of the sleeves 87.

Surrounding the separators 81 are the hubs 102 of the scrapers 103 of which one is shown in Fig. 6. It will be seen that in this form of the invention, the scraper extends in one direction only from the axis of the filter assembly, instead of in two directions as do the scrapers 38 illustrated in Fig. 2. The outer ends of the scrapers engage against a lip 104 shown in Fig. 6 as formed by rolling outwardly the free edge of the sheet metal which constitutes one side of the substantially cylindrical metallic casing 105. This casing has two such side members, as best seen in Fig. 6, which are connected at their ends by caps 106 having flanges preferably turned inward as shown in Fig. 5.

As in the modification shown in Fig. 7, in which the casing 65 serves as a protection for the filter elements during shipment, so in the present embodiment, the casing 105 also acts as a carton for the shipment of the filter assembly. It will readily be understood without illustration that the opening 107 which runs lengthwise of the casing opposite the inlet opening 74, and also the opening 108 which runs longitudinally of the casing opposite the outlet opening 71 may readily be covered during the shipment by removable strips, as for example flanged metal strips which may engage the lips 104, as by sliding longitudinally thereon.

In assembling the elements within the casing, the scrapers will be set so that the ends all lie within the opening 108 which will be placed downward when the casing is slid into the tank 70.

The friction of the elastic lips 104 on the sides of the tank 70 will be sufficient to prevent rotation of the casing 105 within the tank 70. The ends of the casing, indicated at 106 in Fig. 5, will have central openings to fit upon the exterior of the sleeves 87, so that the entire filter disk assembly may be turned by the handle 100 in one direction, preferably clockwise, when the notch 98 engages the pin 99, but if the handle is turned in the reverse direction, the sloping side of the notch will slide off the pin 99. As the disks are rotated, their sides will be engaged by the lateral edges of the curved scrapers 103, the arched shape of these scrapers serving to strengthen their resistance to the pressure exerted upon them by the adherent dirt and filter aid upon the surfaces of the disks rotated toward them. As this dirt is loosened, it will fall downward immediately along the front surface of the scrapers into the space 108 between the two lower lips 104. Around the outer edge of each filter disk is a metallic band 109 (Figs. 13 and 14) upon which is secured as by spot welding, a plurality of vanes 110 set at an angle to the planes of rotation of the disks to which they are attached, this angle for any disk being such as to cause the vane to push the sludge toward the nearest outlet 71. The valves 72 will be opened before this cleaning process is started and the heavy solid matter will pass rapidly down into the tank 73. It will be noted that the dirt will adhere equally to both sides of each disk, since the suction will be uniform at substantially all points of the disk, and when the adherent dirt is detached, it can fall less than half of the diameter of a disk to the bottom without interference from dirt from any other disk, and a single rotation of the assembly will move all the sludge the short distance necessary for it to reach an outlet. When the dirt has passed out at the openings 71, the valves can be closed and the filtering operation immediately resumed after depositing a fresh supply of filter aid in the receptacle 12'.

The sludge tank 73 has a petcock 73' in its top to admit air to allow the escape of liquid from above the sludge through another petcock 72' set in the upper part of the removable end cap through which the sludge may be taken out after it has settled. Rotation of the cap slowly will lower the petcock 72' so that practically all of the liquid above the solid matter can be withdrawn before the cap is removed. A valved bypass tube 87' is provided to allow the escape of all air from the top of the tank 70 as it is being filled with liquid. The liquid will rise in the tank and in the pipe 89 simultaneously and all air will escape before any liquid flows out of the pipe 89, whereupon the valve in the bypass will be closed to prevent the passage of unfiltered liquid.

The embodiment shown in Fig. 8 is especially adapted for use as an oil filter for automobiles. It comprises a metallic casing having a cylindrical body 111 and two end caps 112 and 113, either of which may be made integral with the body or permanently secured thereto. In the present embodiment, as illustrated, the lower end cap 112 has a tube 114 welded thereto centrally of one end, this tube being of a length to extend beyond the opposite end of the body to receive the cap 113 which is centrally perforated to engage upon the end of the tube. The cap 113 is shown as having a flange around its edge to rest upon a gasket 115 which is engaged upon its other surface by a flange 116 on the end of the cylindrical body wall 111. A nut 117 threaded upon the end of the tube 114 serves to clamp the cap 113 firmly in position on the gasket 115. Within the body, the tube 114 receives a bottom supporting pad 118 on which rests a filter disk 119 and then a separator member 120 followed by alternating disks and separators for the length of the body, the topmost member being another pad 121 similar to or identical with the pad 118, these two pads at top and bottom being made of a thickness such that when the nut is turned down tight upon the cap 113 no oil can pass the assembly unfiltered.

Near the bottom, the tube 114 has perforations 122 to permit oil to enter the tube on its way to an outlet pipe 123 communicating with the inside of the tube. To prevent any fibrous particles that may become detached from the filter disks or separators from entering the tube, a cylindrical wire screen 124 surrounded by one or more layers of cloth 125 is slipped over the tube 114 into the open channel left through the center of the disks and separators. It will be understood that the disks 119 and the separators 12 have each a central opening similar to that shown in Fig. 11 in the disks 80 and separators 81, while the opening in the pads 118 and 121 is just sufficient to let them go on the pipe 114. An inlet pipe 126 admits oil into the casing and this oil must pass through some one of the porous elements to reach the outlets, since the pads seal the two ends of the assembly and the separators effectively close the spaces between the disks. A plug 127 is used to close the upper end of the tube 114 within the nut.

In this embodiment of the invention, no scrapers are used and hence no means for rotating the disks needs to be provided or any outlet for sludge. The tube 114 serves as an outlet for oil, as a part of the means for clamping the cover in place, and hence as a part of the means for clamping the filter assembly together. When the filter becomes covered with dirt to a point where filtration is too greatly retarded, the nut 117 will be released, the filter disk assembly will be removed and discarded, and a new assembly will be inserted. The cost of replacement will be too small to make it worth while to clean the used elements.

In certain types of filters such as that shown in patent to Heckman, 2,041,763, above mentioned, a plurality of fabric filter bags are used which have many disadvantages. As a replacement unit for this form of filter element, Figs. 15 and 16 illustrate a sheet of rigid, coherent, fibrous material 128 having a slot 129 cut for somewhat over half of its length, this slot being covered by a sheet metal member 130 riveted along its sides to hold it in tight contact with the surface of the sheet 128, the outer end of the member 130 being formed into a tapering tube 131 for insertion into the tapering sockets of a manifold as well known in the art and specifically shown in the Heckman patent cited. Liquid under pressure in a container in which such a filter element is mounted will pass through both surfaces into the porous interior longitudinally of the interior to the outlet passage or slot 129 leading to the manifold. A similar device is shown in Fig. 17, in which the metallic member 132 extends around the edges of the sheet instead of through the center, the liquid in this device passing outward from the central part of the sheet to the channel formed between the edges of the sheet and the metallic strip that leads to the tapering tube 133.

As shown in Figs. 2 and 6, the edges of the double scrapers 38 and the single scrapers 103 which engage with the sludge on the surfaces of the filter disks are formed as curves which at their inner ends are tangential with the hubs 39 or 102 and which extend outward in the direction of rotation of the disks toward the rims, being at a greater angle than 45° to the radius from the center to where they cross the rim. Thus as the detached solid matter slides along the scraper, it is pushed outward from the center. If the scraper were set radially, the matter on the disk would pile up between the disks and make rotation of the disks substantially impossible.

The constructions shown are to be considered as merely illustrative since it will be evident that many changes in the form, proportions, number of elements, and other details of construction may be made without departing from what is claimed.

I claim:

1. A filter comprising a container for liquid under pressure, a filter element consisting of a stiff, self-supporting, coherent, substantially homogeneous body of fibrous material, permeable to liquid in all directions but of a density such as to prevent the passage of finely divided filter aids, said element being mounted within said container whereby to permit the deposit of filter aid upon its surface exposed to the liquid under pressure, and said element being provided with a passage connected with its interior and communicating with the exterior of the container to permit the outlet of filtered liquid.

2. A filter comprising a plurality of sheets of rigid, coherent, cellulose material, a perforated tube communicating with the exterior of the filter on which said sheets are mounted, separators of smaller diameter than said sheets surrounding the tube and interposed between adjacent sheets whereby to expose both surfaces of said sheets to liquid under pressure to be filtered, the sheets and separators having portions thereof removed to provide a passage for the tube of greater diameter than the tube, the arrangement being such that liquid in contact with said sheets will enter both surfaces and pass longitudinally of said sheets and through the perforations in the pipe.

3. A filter assembly comprising a plurality of fibrous sheets, a plurality of spacers of smaller diameter than the sheets and interposed between the sheets to hold them in spaced relation, the sheets and the spacers having a passage for liquid formed therethrough, a flanged member at each end of the assembly of sheets and spacers, rods passing through said spacers and connecting said flanged members, and means for placing the rods under tension to compress the sheets between the spacers.

4. A filter assembly as in claim 3, in which the sheets have bushings surrounding the rods, with the ends of the bushings in engagement with the spacers to limit the amount of compression of the sheets.

5. A filter comprising a container for liquid under pressure, a plurality of filter disks mounted for rotation within the said container, a plurality of spacers of smaller diameter than the disks and interposed between the disks to hold them in spaced relation, a scraper interposed between two adjacent disks, means for preventing the scraper from rotation, means for rotating said disks, and vanes upon the periphery of the disks set at an angle to the plane of said disks and movable adjacent to the bottom of the tank to move material scraped from the disks sidewise horizontally toward an outlet from the container.

6. A filter comprising a container for liquid under pressure, a plurality of filter elements mounted for rotation on a horizontal axis, scrapers interposed between the said elements to detach refuse material from the surfaces of said elements when they are rotated, an outlet in the bottom of the container to receive the refuse material, and vanes upon the periphery of said filter elements adapted to engage the detached refuse and move it toward said outlet.

7. A filter comprising a plurality of filter disks having substantially parallel surfaces and mounted for rotation on an axis, a plurality of spacers interposed between said disks to hold them in spaced relation, a plurality of scrapers each having a hub surrounding and closely adjacent to one of said spacers and extending outwardly from said hub toward the periphery of said disks, the scraping edges of said scrapers lying closely adjacent to the surfaces of the adjacent disks and being inclined in a curve extending outwardly from the hubs in the direction of rotation of the disks and at a gradually increasing angle thereto, whereby to thrust solid matter on the surfaces of said disks away from the axis of rotation.

8. A filter comprising a plurality of sheets of rigid, coherent, cellulose material, separators of smaller diameter than said sheets interposed between adjacent sheets whereby to expose both surfaces of said sheets to liquid under pressure to be filtered, the sheets and separators having portions thereof removed to provide a passageway therethrough, means to hold said sheets and separators with said passageways in alinement to form a continuous conduit for collection of filtrate, the arrangement being such that liquid in contact with said sheets will enter both surfaces thereof to pass longitudinally of said sheets into said filtrate conduit, a casing to enclose the assembly of sheets and separators and to retain the fluid surrounding the same, an inlet and an outlet formed in said casing, said inlet being in communication with a body of fluid surrounding said sheets and the outlet being in communication with the filtrate conduit formed by the passageways in said sheets and separators.

9. A filter comprising a plurality of sheets of rigid, coherent, cellulose material, separators of smaller diameter than said sheets interposed between adjacent sheets whereby to expose both surfaces of said sheets to liquid under pressure to be filtered, the sheets and separators having portions thereof removed to provide an open passageway for filtrate thru said sheets and separators, a filtrate drainage tube thru said passageway, a casing to enclose said sheets and separators and said tube, a filtrate outlet in said casing having communication with said tube, an inlet in said casing to conduct a fluid into communication with the exterior surfaces of said sheets, the arrangement being such that liquid in contact with said sheets will enter both surfaces and pass longitudinally of said sheets and into said tube, thence away from said casing, means for compressing said sheets and separators together to prevent leakage therebetween.

10. A filter comprising a plurality of sheets of rigid coherent cellulose material, a drainage passageway thru each sheet, separators of smaller diameter than said sheets interposed between adjacent sheets whereby to expose both surfaces of said sheets to the liquid under pressure to be filtered, drainage passageways thru said separators to register with the drainage passageways in said sheets, the arrangement being such that liquid in contact with said sheets will enter both surfaces thereof and pass longitudinally of said sheets into said passageways, a casing to enclose said sheets and separators including means to compress the same into the form of a crenelated filter column having a continuous passageway therethru for the collection of filtrate, an outlet opening in said casing in communication with the passageways thru said elements and separators, and an inlet opening adapted to conduct the fluid to be filtered into said casing.

STANLEY MALANOWSKI.